United States Patent
Cho et al.

(10) Patent No.: US 12,210,526 B1
(45) Date of Patent: Jan. 28, 2025

(54) RELATIONAL SUBTREE MATCHING FOR IMPROVED QUERY PERFORMANCE

(71) Applicant: SAP SE, Walldorf (DE)

(72) Inventors: Young Goo Cho, Seoul (KR); Jaehyok Chong, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/382,994

(22) Filed: Oct. 23, 2023

(51) Int. Cl.
*G06F 16/00* (2019.01)
*G06F 16/2453* (2019.01)

(52) U.S. Cl.
CPC .. *G06F 16/24542* (2019.01); *G06F 16/24537* (2019.01)

(58) Field of Classification Search
CPC ........... G06F 16/24542; G06F 16/9535; G06F 16/24539; G06F 16/24524; G06F 16/24578; G06F 16/2455; G06F 16/24552; G06F 16/951; G06F 16/24522; G06F 16/24558; G06F 40/30; G06F 16/248; G06F 16/243; G06F 16/256; G06F 40/20; G06F 16/93; G06F 16/00; G06F 40/35; G06F 16/24549; G06F 11/3409; G06F 11/3628; G06F 11/3636; G06F 16/217; G06F 16/2246; G06F 16/2433; G06F 16/24561; G06F 16/24573; G06F 16/284; G06F 2201/80; G06F 8/427
See application file for complete search history.

(56) References Cited

U.S. PATENT DOCUMENTS

| | | | |
|---|---|---|---|
| 6,466,931 B1* | 10/2002 | Attaluri | G06F 16/24524 707/999.005 |
| 2003/0225751 A1* | 12/2003 | Kim | G06F 16/3347 707/E17.08 |
| 2019/0266170 A1* | 8/2019 | Hazel | G06F 16/221 |
| 2023/0401274 A1* | 12/2023 | Denninghoff | G06Q 30/0251 |

\* cited by examiner

*Primary Examiner* — Shyue Jiunn Hwa
(74) *Attorney, Agent, or Firm* — Klarquist Sparkman, LLP

(57) ABSTRACT

The present disclosure provides techniques and solutions for improved query optimization. A query plan is received, and at least a portion of the query plan is identified to be analyzed for logically equivalent query plans. A signature is generated for the at least a portion of the query plan. One or more query plans are identified that have signature that matches the signature of the at least a portion of the query plan, but where such query plans are logically equivalent, but not identical, to the at least a portion of the query plan. A query plan of the one or more query plans is substituted in the query plan for the at least a portion of the query plan.

20 Claims, 15 Drawing Sheets

```
select top 100 i_item_id ,i_item_desc ,s_state
    , count( ss_quantity) as store_sales_quantitycount , avg( ss_quantity) as store_sales_quantityave
    , stddev_samp( ss_quantity) as store_sales_quantitystdev
    , stddev_samp( ss_quantity)/avg( ss_quantity) as store_sales_quantitycov
    , count(sr_return_quantity) as store_returns_quantitycount
    , avg(sr_return_quantity) as store_returns_quantityave
    , stddev_samp( sr_return_quantity) as store_returns_quantitystdev
    , stddev _samp( sr_return quantity)/ avg( sr_return_ quantity) as store_returns_quantitycov
    , count( cs_quantity) as catalog_sales_quantitycount , avg( cs_quantity) as catalog_sales_quantityave
    , stddev_samp( cs_quantity)/avg( cs_quantity) as catalog_sales_quantitystdev
    , stddev_samp( cs_quantity)/avg( cs_quantity) as catalog_sales_quantitycov
from store_sales, store_returns, catalog_sales
    , date_dim d1 , date_dim d2 , date_dim d3 , store , item
where d1.d_quarter name = '2000QI' and d1.d_date_sk = ss_sold_date_sk
    and i_item_sk = ss_item_sk and s_store_sk = ss_store_sk
    and ss_customer_sk = sr_customer_sk and ss_item_sk = sr_item_sk
    and ss_ticket_number = sr_ticket_number and sr_returned_date_sk = d2.d_date_sk
    and d2.d_quarter_name in ( '2000Q1','2000Q2','2000Q3')
    and sr_customer_sk = cs_bill customer_sk and sr_item sk = cs_item_sk
    and cs_sold_date_sk = d3.d_date_sk
    and d3.d_quater_name in ('2000Q1','2000Q2','2000Q3')
group by i_item_id ,i_item_desc ,s_state
order by i_item_id ,i_item_desc ,s_state;
```

1200

```
Sort((8367, 2), (8367, 1), (8367, 0),
Group((3189, 24), (4258, 4), (4258, 1),
STDDEV_SAMP((9635, 10)), STDDEV_SAMP((6751, 10)), STDDEV_SAMP((1497, 18)),
AVG((9635, 10)), AVG((6751, 10)), AVG((1497, 18)),
COUNT((9635, 10)), COUNT((6751, 10)), COUNT((1497, 18)),
[edge: 1497, 9635, INNER, (((9635, 3)=(1497, 3)) and ((9635, 2)=(1497, 15)))]
[edge: 1497, 1630, SEMI, (1497, 0)=(1630, 0)]
[edge: 6751, 8849, SEMI, (6751, 0)=(8849, 0)]
[edge: 6751, 9635, INNER, (((9635, 9)=(6751, 9)) and ((9635, 3)=(6751, 3)) and ((9635, 2)=(6751, 2)))]
[edge: 6751, 4258, INNER, (6751, 2)=(4258, 0)]
[edge: 6751, 3189, INNER, (6751, 7)=(3189, 0)]
[edge: 9635, 1630, SEMI, (9635, 0)=(1630, 0)]
(Select((((2760, 15)='2000Q3') or ((2760, 15)='2000Q2') or ((2760, 15)='2000Q1')), TableAccess(DATE_DIM)),
Select((2760, 15)='2000Q1', TableAccess(DATE_DIM)),
TableAccess(CATALOG_SALES),
TableAccess(ITEM),
TableAccess(STORE),
TableAccess(STORE_RETURNS),
TableAccess(STORE_SALES))))
```

1220

1240

```
select count(*) from catalog_sales
where cs_sold_date_sk in (select d_date_sk from date_dim where d_quarter_name = '2000Q3' or
d_quarter_name '2000Q2' or d_quarter_name '2000QI');
```

1250

1244

```
[edge: 1497, 1630, SEMI, (1497, 0)=(1630, 0)]
(Select((((2760, 15)='2000Q3') or ((2760, 15)='2000Q2') or ((2760, 15)='2000Q1')),
TableAccess(DATE_DIM)),
TableAccess(CATALOG_SALES))
```

FIG. 12

RELATIONAL SUBTREE MATCHING FOR IMPROVED QUERY PERFORMANCE

FIELD

The present disclosure generally relates to query optimization. Particular implementations relate to techniques for identifying logically equivalent query trees to a query tree or subtree being optimized.

BACKGROUND

Modern database systems frequently process vast amounts of data. Queries in such systems can access a multitude of tables and views, each with numerous attributes. Enterprise-level software applications often employ queries involving hundreds of tables, some of which might have hundreds of attributes. These queries can encompass a wide range of operations, including diverse join operations with varying conditions, and other tasks such as grouping and ordering.

When a query is presented to a database system, components like a query optimizer generate computer-executable commands for the operations specified in the query. This optimizer analyzes the query to identify efficient execution paths. It may choose specific data access methods or even consider rewriting segments of the query for better performance.

Query optimizers employ various techniques, including rule-based and cost-based methods. However, as a query plan becomes more complex, the number of potential plans (and their variations) that an optimizer might consider—referred to as the search space expands nearly exponentially. Often, due to time and computational constraints, the optimizer cannot evaluate every potential plan within this space.

To streamline optimization, an optimizer might reuse parts of previous query plans or data generated during prior executions of all or a portion of a query plan. If a segment (such as a subtree) of a current query plan mirrors a previously optimized segment, the optimizer can adopt the optimized segment directly. This not only enhances performance but also narrows down the search space, allowing the optimizer to probe other areas more exhaustively. Similarly, if the optimizer detects that certain results, be they cached or anticipated intermediate outputs, align with portions of the current query, it can craft a plan that retrieves these results directly rather than reexecuting the underlying operations. For instance, if a query operation mirrors the data in a materialized view, the optimizer might substitute that operation with a direct call to the view.

However, this strategy is not foolproof. Often, optimizers are designed to spot only exact matches between operations in the current query and previous ones, thereby restricting opportunities to reuse optimized plans or cached results. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, the present disclosure provides a process of substituting a portion of query plan with another query plan by comparing query plan signatures. A query plan is received. At least a portion of the query plan to be analyzed for logically equivalent query plans is identified. A signature for the at least a portion of the query plan is generated. One or more query plans having a signature that matches the signature for the at least a portion of the query plan and which are logically equivalent, but not identical, to the at least a portion of the query plan are determined. In the query plan, a query plan of the one or more query plans or results of executing the query plan of the one or more query plans are substituted for the at least a portion of the query plan in the query plan.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 12 provides a specific query and a corresponding representation of the decomposed query.

DETAILED DESCRIPTION

Example 1—Overview

Figure 1:
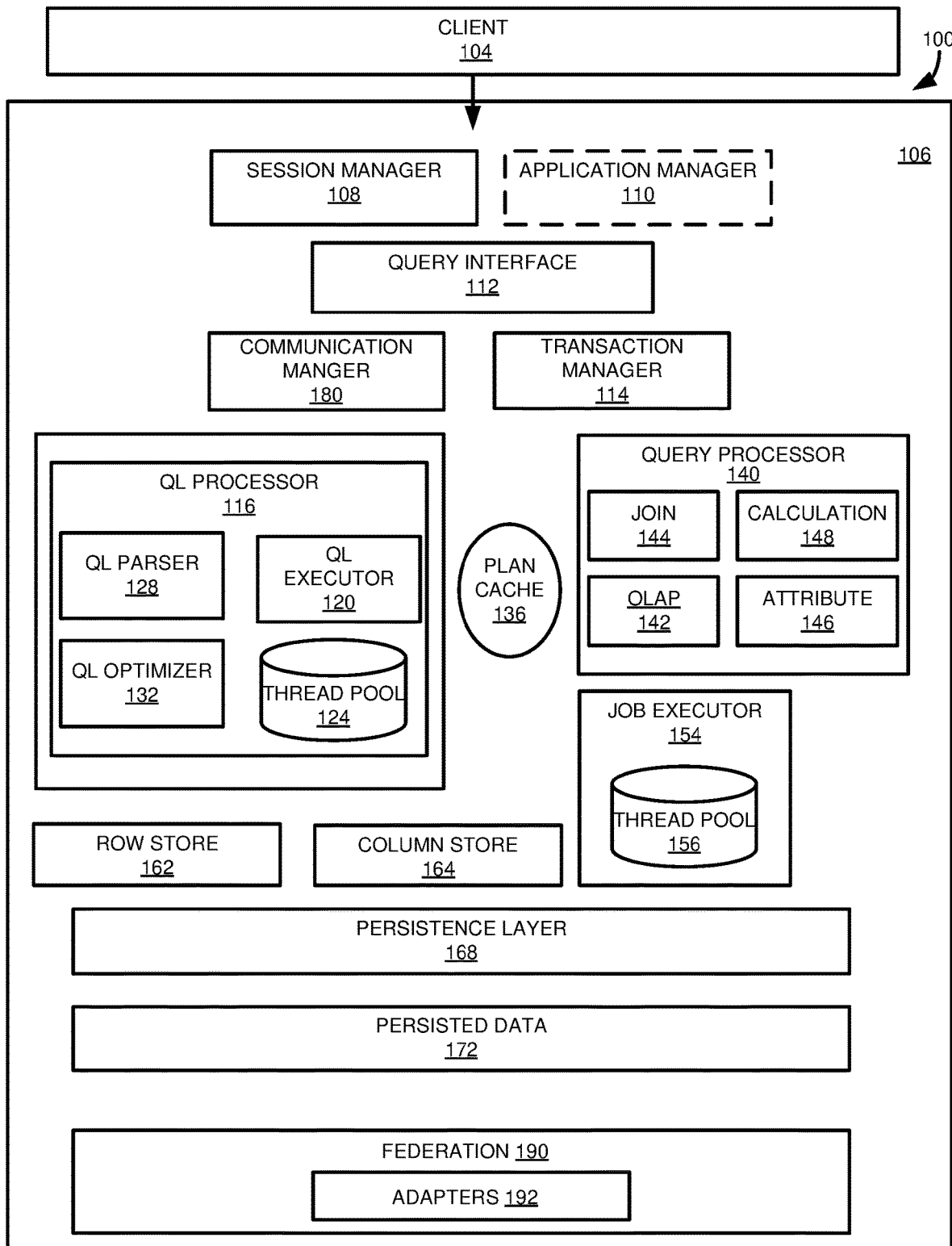
FIG. 1 is a diagram depicting an example database system which can be used in implementing aspects of disclosed technologies.

Modern database systems frequently process vast amounts of data. Queries in such systems can access a multitude of tables and views, each with numerous attributes. Enterprise-level software applications often employ queries involving hundreds of tables, some of which might have hundreds of attributes. These queries can encompass a wide range of operations, including diverse join operations with varying conditions, and other tasks such as grouping and ordering.

When a query is presented to a database system, components like a query optimizer generate computer-executable commands for the operations specified in the query. This optimizer analyzes the query to identify efficient execution paths. It may choose specific data access methods or even consider rewriting segments of the query for better performance.

Query optimizers employ various techniques, including rule-based and cost-based methods. However, as a query plan becomes more complex, the number of potential plans (and their variations) that an optimizer might consider—referred to as the search space expands nearly exponentially. Often, due to time and computational constraints, the optimizer cannot evaluate every potential plan within this space.

To streamline optimization, an optimizer might reuse parts of previous query plans or data generated during prior executions of all or a portion of a query plan. If a segment (such as a subtree) of a current query plan mirrors a previously optimized segment, the optimizer can adopt the optimized segment directly. This not only enhances performance but also narrows down the search space, allowing the optimizer to probe other areas more exhaustively. Similarly, if the optimizer detects that certain results, be they cached or anticipated intermediate outputs, align with portions of the current query, it can craft a plan that retrieves these results directly rather than reexecuting the underlying operations. For instance, if a query operation mirrors the data in a materialized view, the optimizer might substitute that operation with a direct call to the view.

However, this strategy is not foolproof. Often, optimizers are designed to spot only exact matches between operations in the current query and previous ones, thereby restricting opportunities to reuse optimized plans or cached results. Accordingly, room for improvement exists.

As a specific example, there are many cases where a query can be rearranged to provide equivalent results. At least certain types of join operations can be rearranged without changing an overall result set. Typical query optimizers may check to see if an exact set of join operations exists in a current query plan or a previously analyzed query plan. If so, the query optimizer may use a prior query plan (which can be a full or partial query plan, where, for the remainder of the discussion, unless explicitly indicated otherwise, or implied by the context, "query plan" is used to refer to an overall query plan as well as query plans for particular sets of operations within the overall query). Thus, a query optimizer may not recognize that a query being optimized has operations that are logically equivalent to operations in another query plan, where that query plan or execution results therefrom could be reused in the query being optimized.

Identifying logically equivalent query plans can be computationally expensive, particularly for large queries with large numbers of possible query plans. In addition to simply having a large number of operations that can be divided into subplans, a query optimizer can have a choice in how such subplans are defined, and thus what plans may be logically equivalent. For example, consider the case of a join between a table T1 and a table T2, where the result is in turn subject to a join with a table T3. The query optimizer might look for logical equivalents to the entire set of query operations, or may define the query plan for which logical equivalents will be analyzed to be just the join between T1 and T2.

The present disclosure provides techniques and solutions for determining whether query plans are logically equivalent. Generally, the present disclosure provides a technique for generating a signature for a query plan. The signature can be compared with signatures from other queries to determine whether any such queries are logically equivalent to the query under consideration. If so, the query optimizer can consider using the query plan for the logically equivalent query, or to use execution results from the logically equivalent query. Note that while disclosed techniques can compare a query plan for a query to query plans for different queries, the techniques can also be used to compare different subportions of the same query. That is, it can be determined if a set of operations in the query is logically equivalent to operations to another set of operations in the query.

To determine whether queries are logically equivalent, including in a process of enumerating logically equivalent queries, a signature of a query can be generated. A signature can correspond to a decomposition result for a query, such as a result that summarizes operations in the query. As a simple example, consider a series of joins in a left deep query plan. Each join can be represented as an element of a signature for the query plan. Now, consider that another query plan performs joins on a same set of tables, but in a different order. Even though the query has operations in a different order, the decomposition result for the second query is the same as that of the first query.

Disclosed techniques can be used with queries that contain operations other than join operations, such as those having union, group by, or order by operations, among others. If desired, rules can be applied for these operations in generating a signature of query or for determining logical equivalency. In general, the definition of a query signature or equivalency rules can provide that a given operation (optionally including its operands) is, or is not, capable of having a logical equivalent. However, disclosed techniques can take into account operations that are not capable of having logical equivalents, or where it is desired not to consider such logical equivalency, even if it may exist. For example, logical equivalency may be possible with group by operations, but it may be desired not to consider equivalency during query optimization. Omitting some operations from logical equivalency analysis can be based on a variety of considerations, such as if replacement is not likely to improve query optimization, or if determining logical equivalency for all operator types would be more computationally expensive than desired, including if determining logical equivalency for one operator is more costly than determining equivalency for another operator.

In a particular example, components of a query plan can be represented by a total eligibility set (TES), where the components can be used as the signature of a query plan, such as for use in determining whether the signature is logically equivalent to that of another query plan. A TES can, for example, represent operators as edges, and can represent constraints on operators as hyper-edges. For instance, join operators can be represented as edges, while other types of operators, such as group by or order by operators, can correspond to constraints on a join, and can be represented as hyper-edges.

As noted above, some operators, such as group by operators, may not technically serve as constraints, as they may be reorderable in at least some circumstances, but can serve as constraints, in the sense that they limit what operations a computing process will perform when analyzing query plans (or signatures thereof) for logical equivalency. That is, group by operators can be considered as having a "structural form," and therefore are not reordered with respect to other operations, even though in some cases they could be reordered to provide logically equivalent plans. In other cases, edges can be defined in a manner than can be used to represent group by operators, allowing a broader set of logically equivalent query plans to be considered.

The present disclosure also provides an extended TES representation, such as a nested representation of a query plan which can includes total eligibility sets for different operators, subtrees, subtree lists, and operators defined as constraints. Disclosed techniques can include operations that identify constraints, and analyze portions of a query plan prior or subsequent to a given constraint for logical equivalency. That is, the constraints may serve to divide a tree for a query plan into subtrees, where subtrees are then analyzed to determine whether logically equivalent subplans can be identified. Combinations of logically equivalent subplans can be reconsidered along with the constraint operations to determine if a larger query plan is equivalent to the constraint and logically equivalent subplans associated with the constraint.

The present disclosure thus provides various technical benefits, including by identifying more efficient query plans, which can reduce query execution time and resources used for query execution. The disclosed techniques are also beneficial, in that they allow for logically equivalent query plans to be determined efficiently, such as using the signatures described above. The ability to define constraints also can save resources during query optimization, as well as potentially improving the quality of identified plans, since query optimizer resources can be concentrated on a more limited search space.

Example 2 describes an example database system that can be used in implementing disclosed technologies, such as including a query optimizer than implements disclosed techniques. Examples 3-8 describe logical equivalency of query plans and disclosed techniques for detecting logically equivalent query plans, including using particular representations of a query plan, such as a query plan signature.

Example 2—Example Database Architecture

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

The query optimizer 132 can also implement techniques of the present disclosure. For example, the query optimizer 132 can determine a query plan by looking for query plans that are logically equivalent to at least a portion of the query plan, which can allow a previously optimized plan to be used (such as in the plan cache 136) or intermediate results from the query or another query to be used.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at a remote system. In carrying out its functions, the data federation component 190 can include one or more adapters 192, where an adapter can include logic, settings, or connection information usable in communicating with remote systems. Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Figure 2:
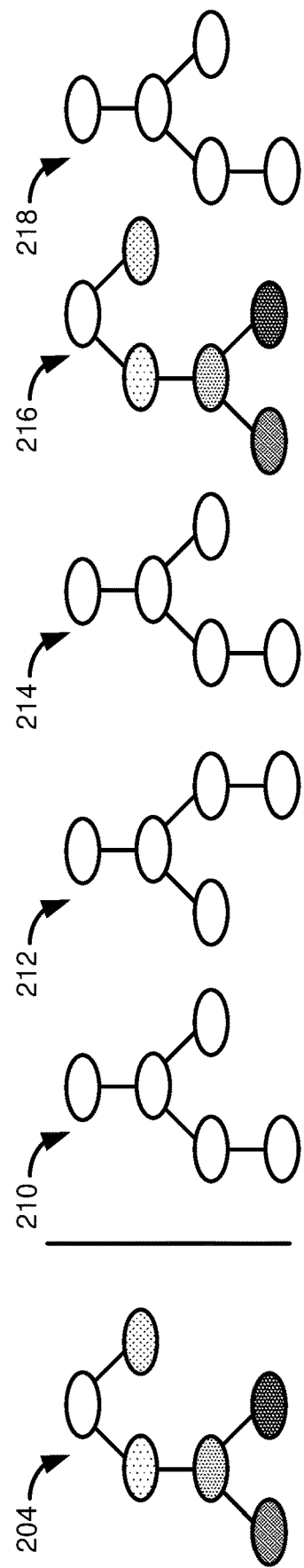
FIG. 2 illustrates a process of identifying a query tree identical to a given query tree.

Example 3—Example Identification of Identical Query Trees and Reuse of Query Plan or Query Execution Result FIG. 2 generally illustrates a process of identifying query plans that are identical to a given query plan. For example, assume a query is received that has a query plan 204. In optimizing the query plan 204, a query optimizer may look to see whether another query having the same query plan has previously been optimized, or if results may exist corresponding to execution of the query plan. Consistent with the discussion of Example 1, the query plan 204 can be a portion of a larger query plan.

The query optimizer may have a number of other query plans 210, 212, 214, 216, 218 available to it, such as being stored in a plan cache accessible to the query optimizer. The query optimizer can then compare the query plan 204 to the query plans 210-218. It can be seen that the query plan 216 is identical to the query plan 204, and thus the query optimizer could consider replacing the query plan 204 with an optimized version of the query plan 216, or to use results generated from the execution of the query plan 214 with the query plan 204.

In FIG. 2, in some cases, the query plans 210, 212, 216, 218 may not only be not identical to the query plan 204, but they may also not be logically equivalent to the query. In other cases, some of the query plans 210, 212, 216, 218 may be logically equivalent to the query plan 204, but a process may not be configured to look for logically equivalent plans. Thus, assuming plan 216 was not present, a process looking only for identical query plans would potentially miss out on optimizations for the query plan 204 if the remaining set of query plans including one or more query plans that were logically equivalent, but not identical, to the query plan 204. Even when query plan 216 is in a set under consideration, it may be that a query plan that is logically equivalent to the query plan 204, but not identical, may provide improved performance compared with the query plan 214.

Figure 3:
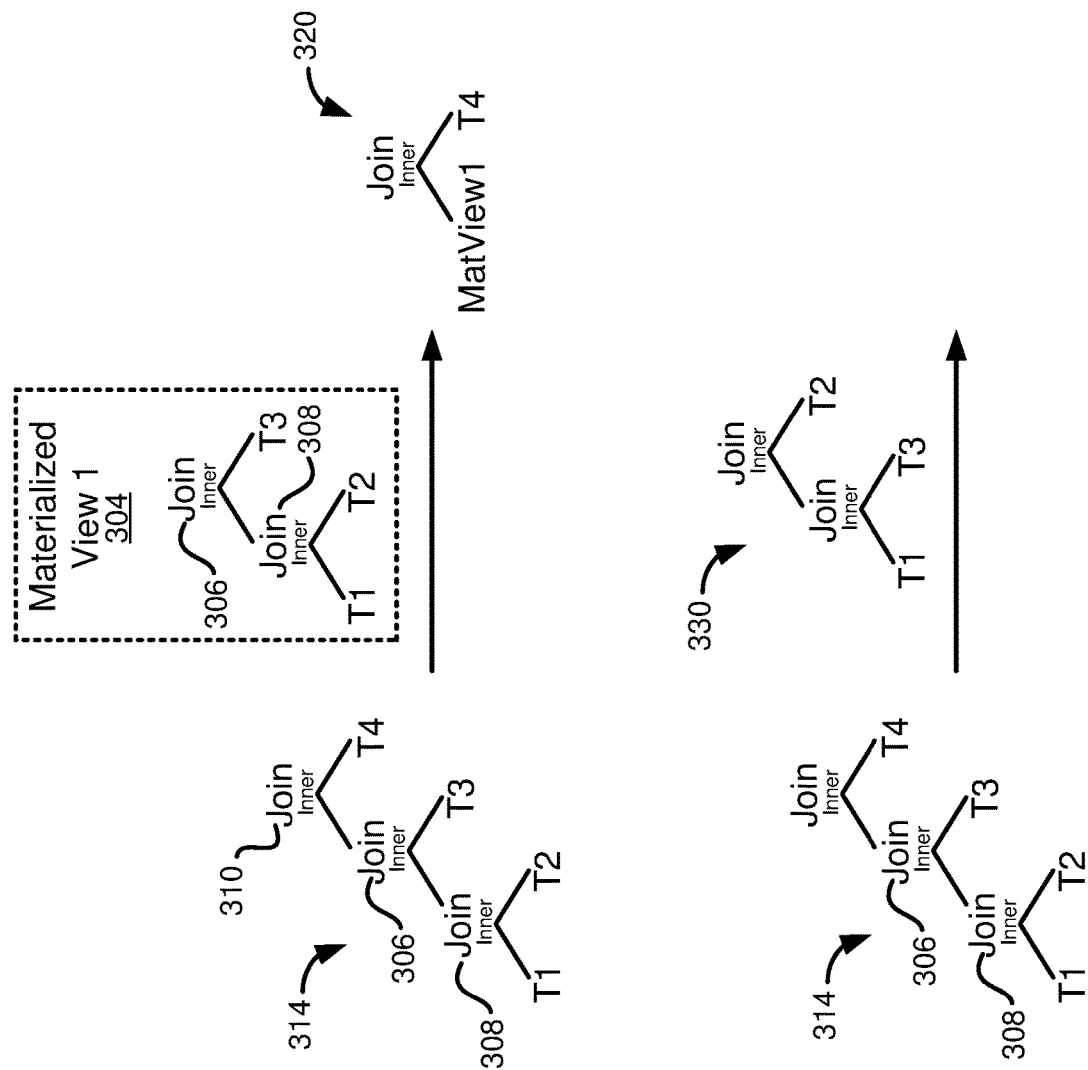
FIG. 3 illustrate how a query plan or query execution results can be reused for an identical query tree.

FIG. 3 illustrates how identifying a query plan that is identical to a query plan being optimized can result in improved query performance. In this case, consider that a materialized view 304 is defined for a series of join operations 306, 308. The materialized view 304 is associated with results. Now, consider a query 314 to be optimized. The query 314 includes the join operations 306, 308, which are combined via a join operation 310 with another table. The query 314 can be optimized by substituting the materialized view 304 for the join operations 306, 308 to provide a revised query plan 320. Since the revised query plan 320 uses the materialized view 304, the join operations 306, 308 need not be executed, resulting in faster processing and less resource use.

Note that the materialized view 304 can correspond to results that are existing at the time of optimization, or results that will or may be available at a later date. For example, the materialized view 304 can correspond to a portion of a larger query that also includes the query 314, and so actual results for the materialized view will be generated when the overall query is executed. In the case where the materialized view 304 corresponds to all or a portion of a different query, the results can exist at the time the query 314 is optimized, or can be provided or updated subsequent to query optimization (but prior to execution of the query). In some cases, the use of the revised query plan 320 can be conditional. For example, during query execution, the revised query plan 320 can be used if the materialized view 304 exists and is associated with a suitable result set, otherwise another query plan can be executed, such as executing the join operations 306, 308.

However, as will be further explained, query plan 330 is logically equivalent to the materialized view 304. If a query optimizer was only looking at identical query plans, it would not consider a possible optimization of, for example, using a materialized view corresponding to the query plan 330 in optimizing the query 314.

Example 4—Example Logical Equivalency of Query Trees

Figure 4:
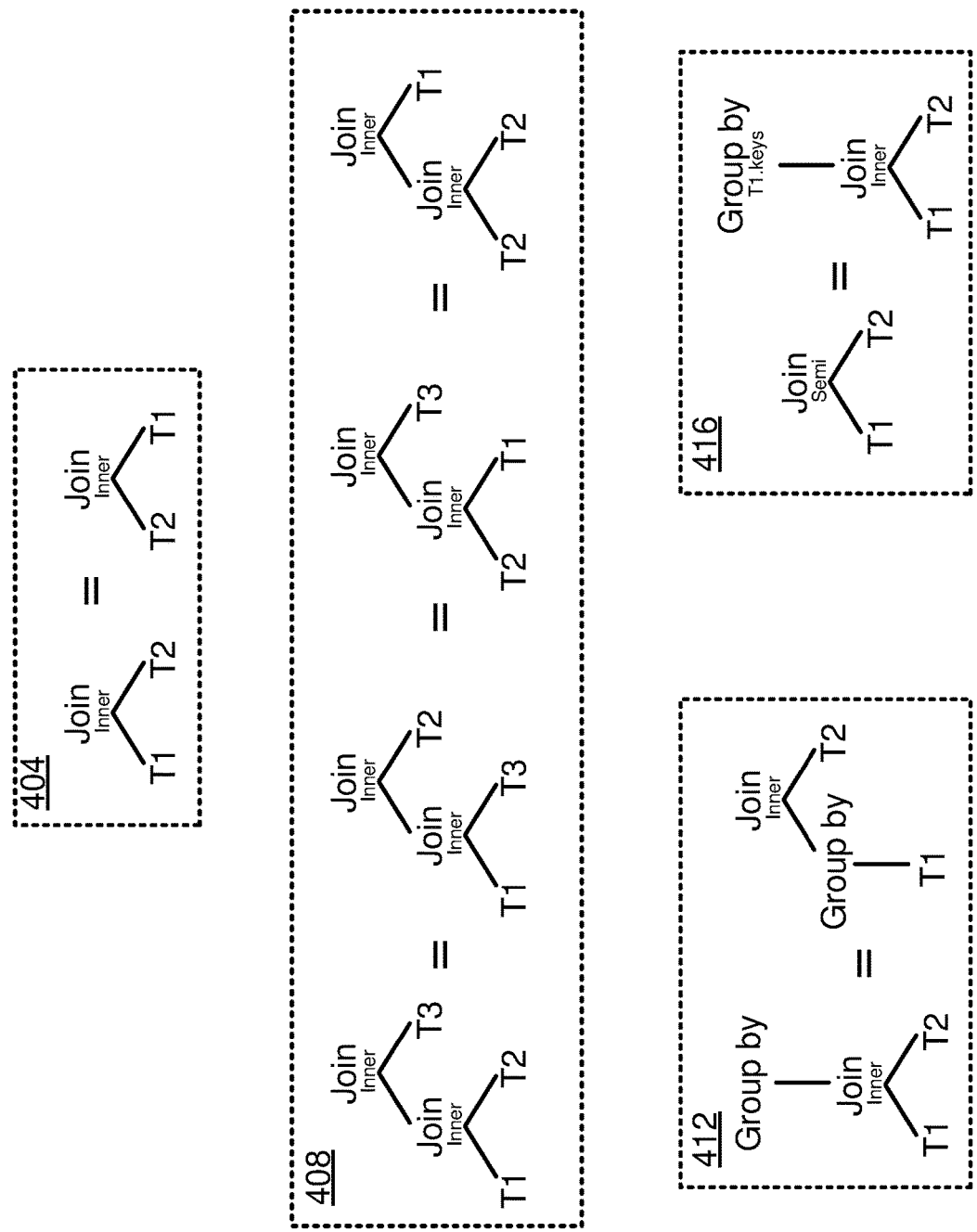
FIGS. 4 and 5 illustrate different types of logically equivalent query trees.

FIG. 4 illustrates logical equivalency for various types of query operations. Scenario 404 illustrates that at least certain types of join operations, such as an inner join, are commutative with respect to the order of the joined tables. In other words, an inner join of Table 1 and Table 2 is equivalent to an inner join of Table 2 and Table 1. Scenario 408 illustrates that at least certain join operations, such as inner join operations, are also commutative with respect to the order of joined tables across multiple levels. For example, for a first join that joins an earlier join result of an earlier, second join of two tables with another table, it does not matter whether a given table in the series of joins is used in the first join or the second join. Thus, the scenarios 404, 408 provide examples of logically equivalent query plan trees.

Scenario 412 illustrates that the order of an inner join and a group by operation are commutative. That is, considering a join of two tables, Table 1 and Table 2, the results of performing the group by operation on the join result are identical to performing the group by operation on Table 1 and joining that result with Table 2. Scenario 416 illustrates a scenario where a semi-join between Table 1 and Table 2 produces identical results to performing an inner join between the two tables and then grouping the resulting data by the primary key values of Table 1. In this context, the semi-join, as that term is used in this example, ensures that even if there are multiple matches in Table 2 for a specific row in Table 1, that rows from Table 1 will be represented only once in the result, with associated data from Table 2 incorporated in that unique row.

Figure 5:
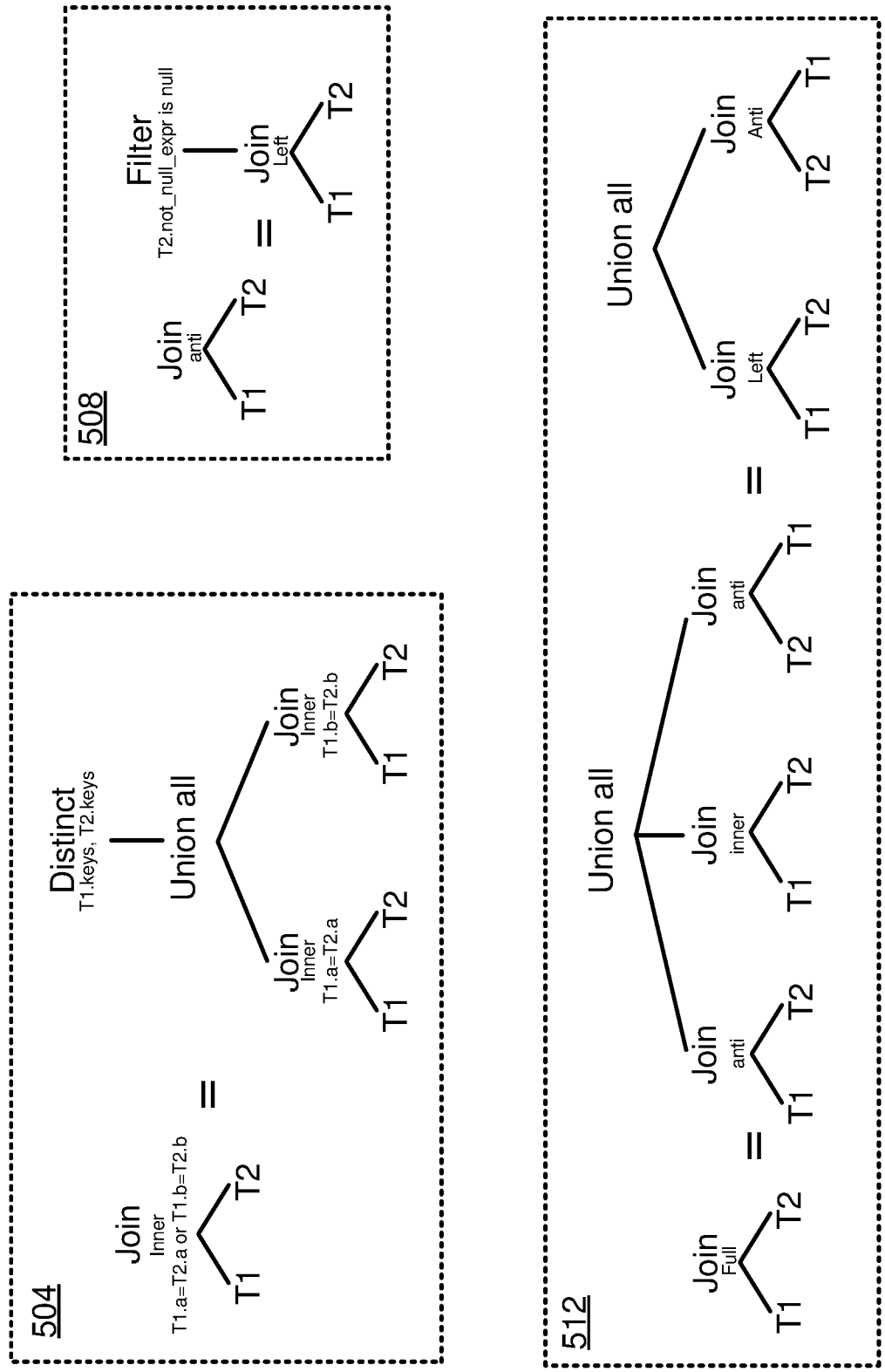

FIG. 5 illustrates additional logical equivalency scenarios. Scenario 504 demonstrates that an inner join of Table 1 and Table 2 based on two possible conditions (related to different columns of Table 1) is logically equivalent to performing a 'UNION ALL' of two separate inner joins of the same tables, each based on one of the join conditions. This is followed by a 'SELECT DISTINCT' operation based on the primary key values of both Table 1 and Table 2 to account for scenarios where both join conditions might be simultaneously satisfied.

Scenario 508 illustrates the logical equivalence of an anti-join between Table 1 and Table 2. The anti-join fetches rows from Table 1 that have no corresponding matches in Table 2. This can be emulated by performing a left join of Table 1 and Table 2, which brings forward all rows from Table 1 alongside matching rows from Table 2 (or NULLs where there are no matches). After the left join, the results can be filtered to only include rows where the Table 2 values are NULL.

Scenario 512 illustrates the logical equivalence of a full join (or full outer join). This join type returns rows where the join condition between Table 1 and Table 2 is satisfied. For unmatched rows in either table, the result will include that row with NULL values for columns from the opposing table. This output can be equivalently achieved by first conducting an inner join between the tables, then performing anti-joins in both directions (Table 1 against Table 2 and vice versa), and finally combining these results using a union all operation. Another equivalent approach is to union the results of a left join of Table 1 and Table 2 with the results of an anti-join between Table 2 and Table 1.

The scenarios of FIGS. 4 and 5 are provided for illustrative purposes, and disclosed techniques can be implemented that do not use all of the logical equivalencies presented, or which use other types of logical equivalence, including as currently known in the database arts or as may be developed.

Figures 6, 7:
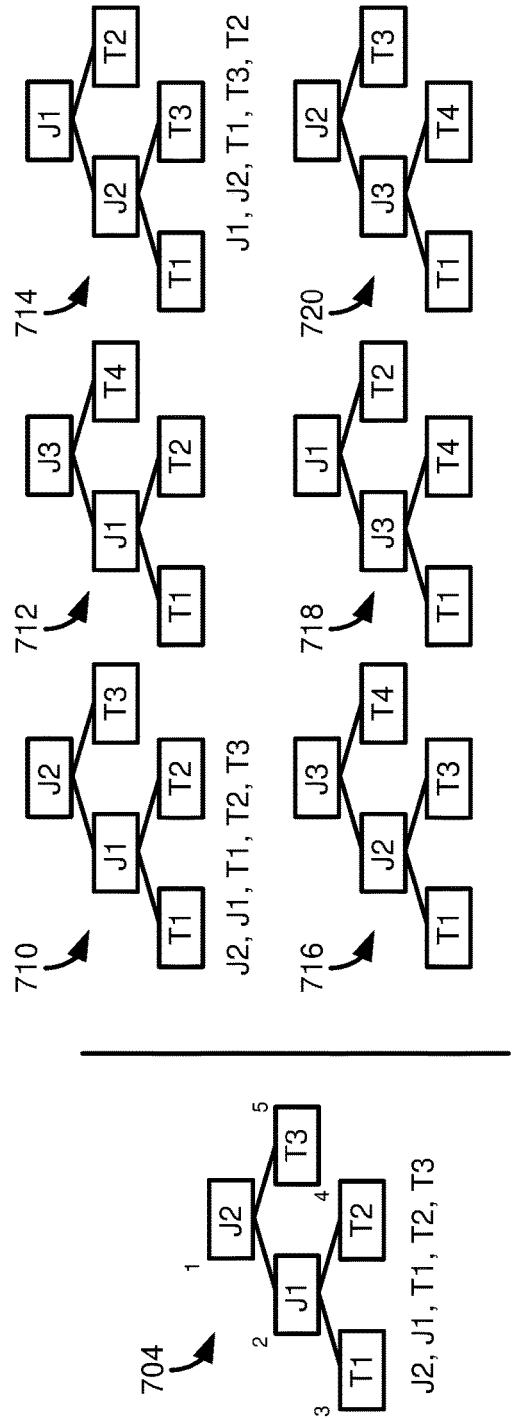
FIG. 6 presents example logical equivalency rules for query trees.
FIG. 7 illustrates how a query tree signature based on an entire query tree can fail to identify logically equivalent query trees.

FIG. 6 provides a general set of equivalency rules 608 that can be used in some embodiments of the present disclosure. For example, rules can be defined that expressions of group by, union all, and projection are tolerant of reordering, such as shown for rule 610, at least under some circumstances. In some cases, determining logical equivalency for filter, group by, and union all operations can be found when the operations are placed at the same location in a query tree, and have the same expressions. Rules 612 provide examples of rules defined according to a principle that expressions of conjunction, disjunction, an "in-list" are tolerant of reordering.

As have been noted, even in cases where logical equivalency can be found, an optimization process can be configured to not analyze certain operations for logical equivalency. For instance, operations under a group by operation can be considered for logical equivalency, provided that the group by operation is used in the same matter. For example, assume a join operation joins the results of a group by operation and a Table 4. Two queries can be considered for logical equivalency based on the operations under the group by operation. However, a query that moves the group by operation above the join (where the join operation can instead join Table 4 and the results of another join) would not be considered for logical equivalency.

While the discussed examples primarily emphasize reordering of operations and their interrelationships, logical equivalence also encompasses variations in the expressions associated with a given operation. Specifically, join predicates or conditions are usually commutative, meaning they can be reordered without affecting the results. However, this may not be true when these predicates or conditions involve non-deterministic functions or subqueries. As an illustration, the sequence of join conditions, such as T1.$a$=T2.$a$ and T1.$b$=T2.$b$, is typically inconsequential. Thus, queries with the same join, but with conditions in different orders, can be logically equivalent.

Example 5—Example Shortcomings of Identifying Logically Equivalent Query Trees Using Query Tree Signature FIG. 7 illustrates a technique for determining identical query plans using query plan signatures. Taking the query plan 704, nodes of the query plan can be traversed in a top-down (pre-order) traversal. The nodes in the query plan are visited in the order shown (the numbers located above the respective nodes) to provide a signature of J2, J1, T1, T2, T3. Signatures can be calculated for query plans 710, 712, 714, 716, 718, 720. In this case, query plan 710 can be determined to be identical to the query plan 704, given that they have identical signatures. However, query plan 714 is logically equivalent to the query plan 704, and could be used in query optimization. Using the signature-based method would not identify query plan 714 for use in query optimization, since its signature is different than the signature for the query plan 704.

Example 6—Example Query Tree Signature Based on Query Tree Decomposition

Figure 8:
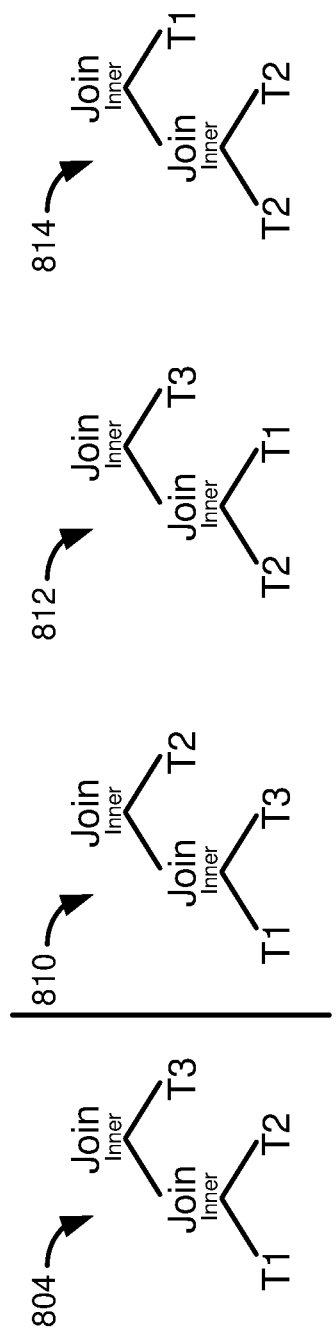
FIG. 8 provides examples of query trees that are logically equivalent to a given query tree.

In some cases, logically equivalent trees can be determined via plan enumeration. For example, as shown in FIG. 8, an initial query plan 804 can be analyzed to produce logically equivalent query plans 810, 812, 814.

Figure 9:
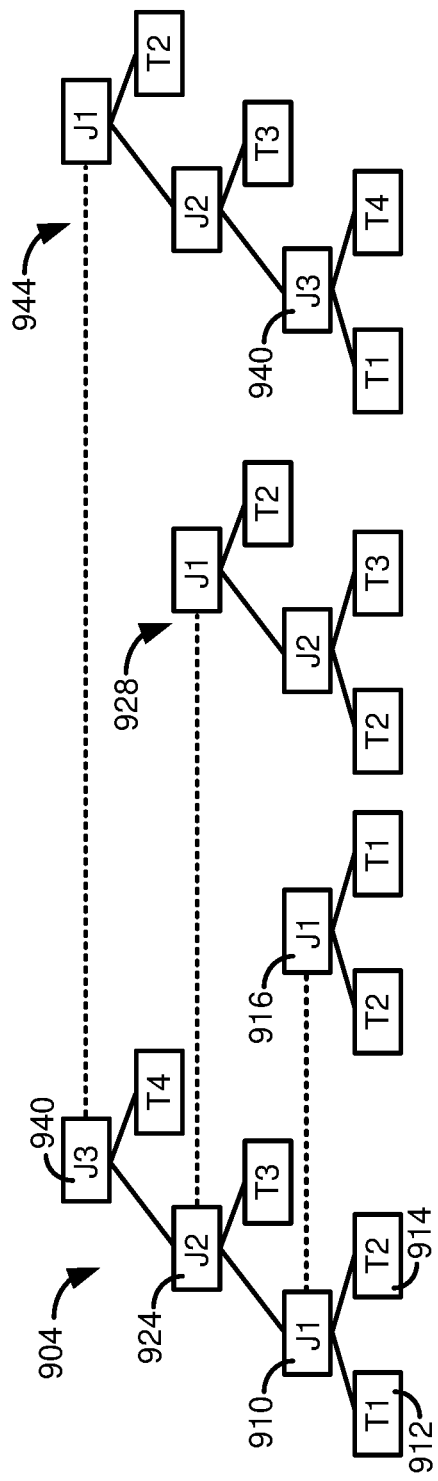
FIG. 9 illustrates how logically equivalent query trees can be generated using enumeration rules.

Types of plan enumeration techniques that can be used include rule-based enumeration and dynamic programming. FIG. 9 illustrates rule-based plan enumeration. For an initial query plan 904, the tree for the query plan can be traversed and various rule applied, including the rules discussed earlier, such as reordering joins or changing the tables used in specific join operations. Considering the join operation at node 910, the relations 912, 914 can be reordered to provide join operation 916, which can be substituted for the join operation of the node 910 in the query plan 904.

Considering the join operation at node 924, the position of the join can be switched with the join at node 910. The relations associated with the joins at nodes 910 and 924 can also be switched, to provide a subtree 928 that can be used with the remainder of the query plan 904.

Various manipulations related to a join at node 940 can also be considered. For example, query plan 944 is logically equivalent to the query plan 904. The query plan 944 changes the join order in the query plan 904, where a join associated with the node 940 of the query plan 904 is relocated lower in the tree for the query plan 944. In addition, the targets of the joins of nodes 910 and 940 have modified, where the join of node 940 is now between Table 1 and Table 4 instead of between the results of a prior join and Table 4, and the join of node 910 joins a join result with Table 2, instead of joining Table 1 with Table 2.

Query plans produced using the described enumeration rules are provided for illustrative purposes, and additional query plans may be produced by further application of general equivalency rules.

Figure 10:
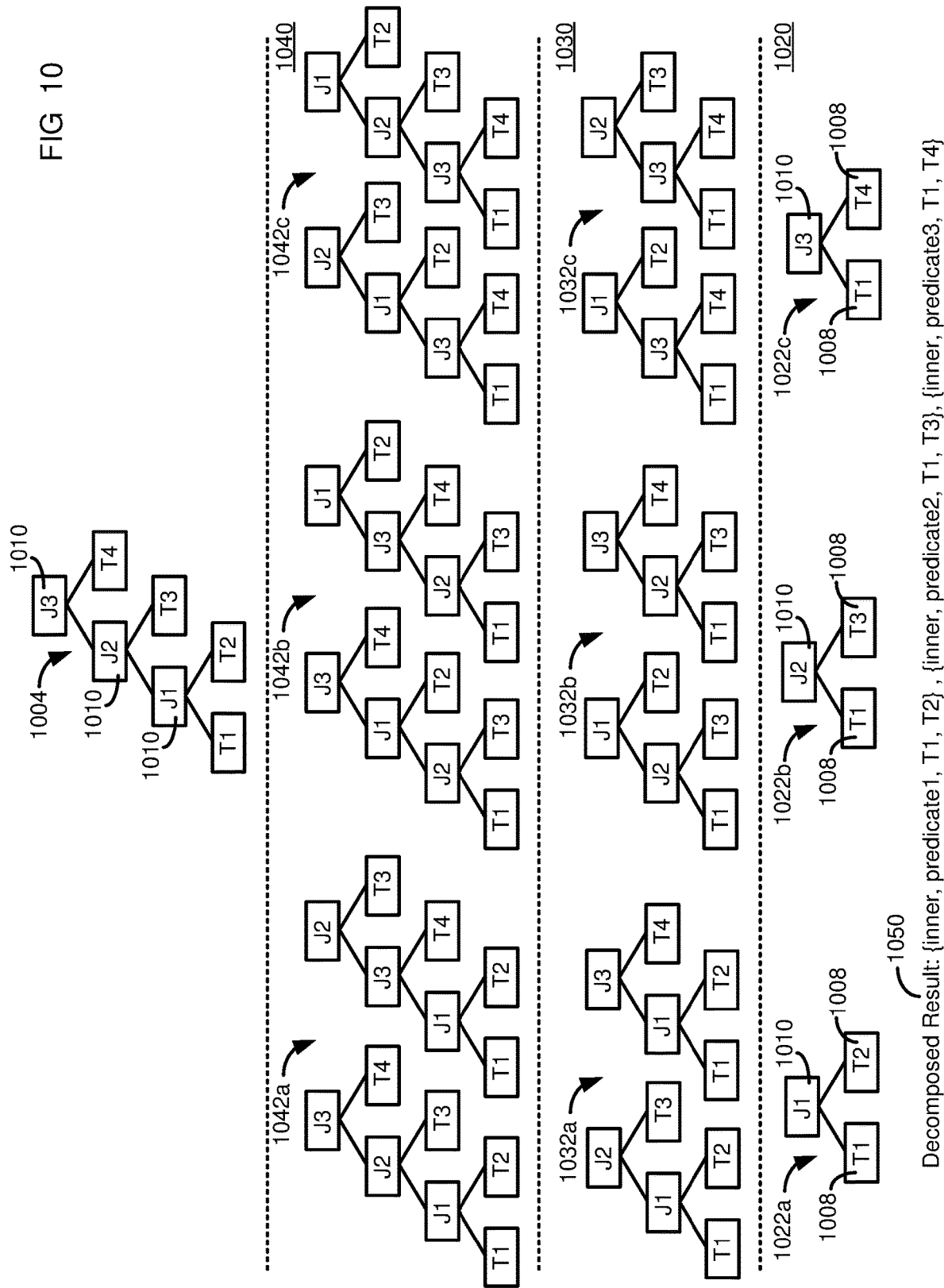
FIG. 10 illustrates how logically equivalent query trees can be generated using dynamic programming.

FIG. 10 illustrates how equivalent query plans can be generated using dynamic programming. In particular, an initial query plan 1004 can be decomposed, such as into tables 1008 of the initial query plan that are subject to join operations 1010. From the base elements, larger trees can be constructed by adding an additional join operation 1010 and table 1008 at each "round" of composition. For example, in a first round 1020 of building query trees from base elements, Table 1 is treated as an anchor table, or pivot table, and join trees 1022a-1022c are created, where each of these join trees uses Table 1 as the left side table, and uses a different join operator and a different right side relation, where the relation can be the relation associated with the respective join operator in the initial query plan 1004. That is, join tree 1022a corresponds to the initial query plan 1004, having a first join between Table 2 and Table 4. In join tree 1022b, join 2 is instead used, and joins Table 1 with the relation, Table, 3, used with join 2 in the initial query plan 1004. Similarly, join tree 1022c uses join 3 to join Table 1 with Table 4, the relation used as the righthand table in the initial query plan 1004.

The tree construction process continues in a second round 1030, where respective sets of trees 1030a-1030c are created using a respective tree 1022a-1022c as a starting point. Each set of trees 1030a-1030c include two trees, corresponding to each of two possible join operators, and their respective righthand relations, that use the join operator in the respective join tree 1022a-1022c as the lefthand relation. For example, the set of trees 1030a is produced by using the results of join 1 as the lefthand relation for either join 2 or join 3, with the righthand relation corresponding to the table used as the righthand relation for the respective join operation in the initial query plan 1004. Tree sets 1030b and 1030c are constructed in an analogous manner as tree set 1030a.

The buildup process continues to a third round 1040. The third round 1040 is carried out in a similar manner as for the second round 1030. The third round 1040 produces tree sets 1042a-1042c, where each tree in a tree set correspond to adding a final join to the trees of the tree sets 1032a-1032c. For example, the trees of the tree set 1032 include a tree with operations join 2 and join 1 and a tree with operations join 3 and join 1. For the tree with operations of join 2 and join 1, the result of join 2 is used as the lefthand relation for the final available join, join 3, with the righthand relation corresponding to Table 4, the righthand relation of join 3 in the initial query plan 1004. The remaining trees of the tree sets 1042a-1042c can be formed in an analogous manner.

Note that the example using the initial query plan 1004 is provided for illustrative purposes, and other tree decomposition and building techniques may be used in the techniques of the present disclosure.

The sets of join trees 1042 (shown as 1042a-1042c) illustrate how decomposition can be used to identify logically equivalent subtrees. That is, for example, consider that all of the join trees 1042 are decomposed to constituent tables, and then used for a first round of tree building, as for round 1020. It can be seen that, regardless of the starting tree of the join trees 1042, the results (decomposition result 1050) of the first round of tree building with be (join 1, Table 1, Table 2), (join 2, Table 1, Table 3), (join 3, Table 1, Table 4). Thus, two trees are logically equivalent if the first round of tree building following tree decomposition for the trees produces an identical result, which then serves as a particular signature for a query tree. Trees with identical signature are logically equivalent to a given tree.

Example 7—Example Decomposition of Query Tree and Query Tree Signature

FIG. 10 provides a relatively simple example of disclosed techniques. In practice, query trees can be more complex to decompose, including into signatures that can be used to identify logically equivalent query trees. Further, for a variety of reasons, it may be beneficial to limit portions of a query tree that are to be analyzed for the availability of logically equivalent query trees, or to divide a query tree into portions that will be separately analyzed to determine whether logically equivalent trees are available. Reordering certain types of operations can produce invalid query plans, and disclosed techniques provide for represented decomposed results for query trees in a form that helps avoid the production of such invalid query plans.

Figure 11A:
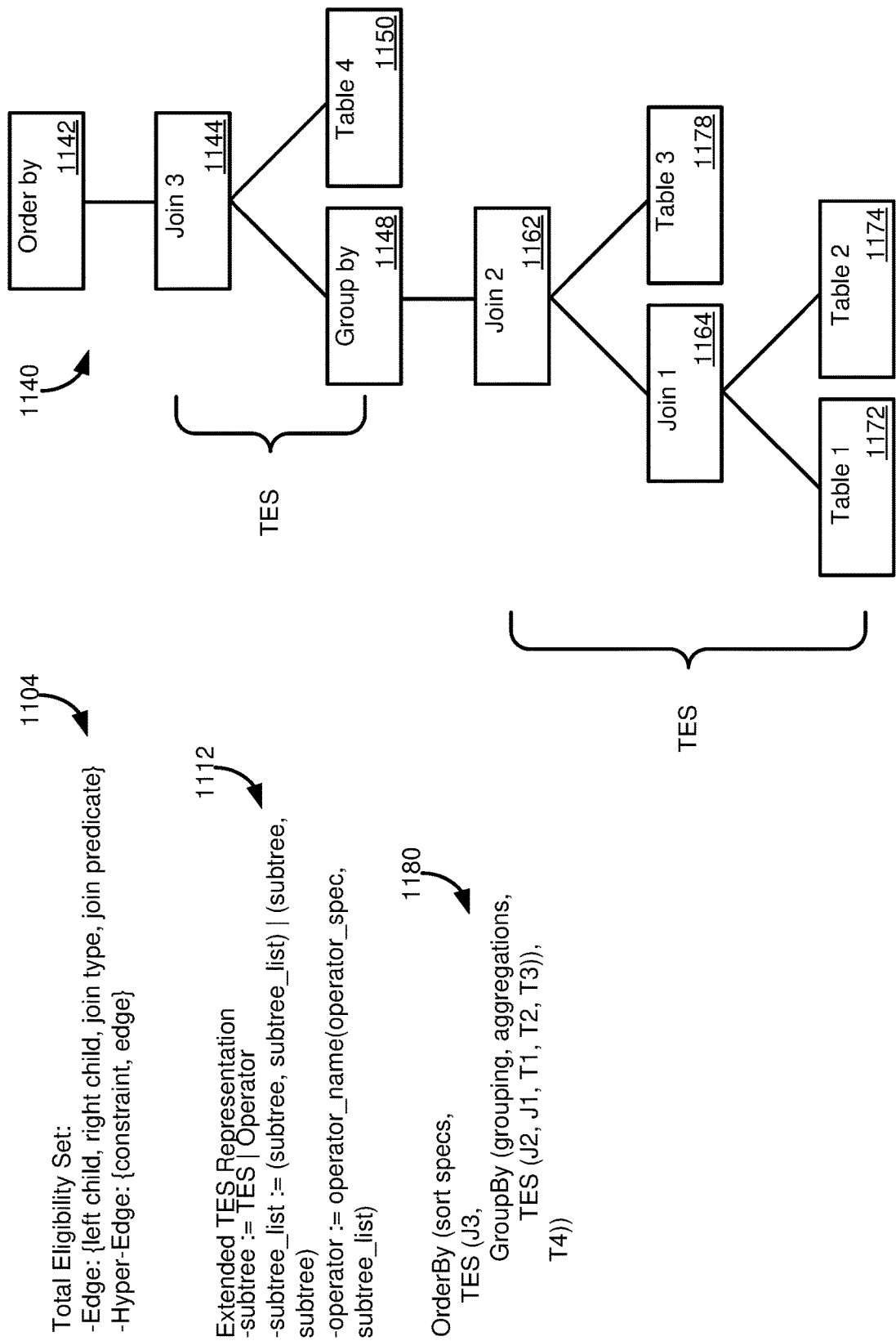
FIG. 11A illustrates example representations for query tree decomposition result, including for an example query tree.

In some implementations, a query tree decomposition can be represented as a total eligibility set (TES), including as indicated in the definition 1104 of FIG. 11A. The definition includes edges and hyper-edges. An edge, in this example, defines a join, where the join is represented by a set of values that includes the left child of the join, the right child of the join, the join type, and the join predicate(s). A hyper-edge places a constraint on a join, where the hyper-edge is represented by a set of values that includes a set of one or more constraints and an edge (as described above, a summary of a particular join operation).

The present disclosure also provided an extended TES representation. The extended TES representation can include representations of operations such as table scans and filters. In the extended TES representation, edges and hyper-edges are sorted, as are terms in filter conditions. Tables (or other types of relations/data artefacts used in a query, such as views) represented in a query tree can be provided with unique identifiers in the extended TES representation. In a particular implementation of TES and extended TES, representations are created for each binary operator in a query tree, and a given query tree can be represented by the collection of such representations for binary operators in the query tree. Although described as being used for binary operators, disclosed techniques can be used for operators of different arity.

FIG. 11A also provides a definition 1112 of the extended TES representation, which can be considered as a grammar describing a query tree. The definition 1112 includes a subtree element, which can be a TES, according to the definition 1104, for example, or an operator. The definition 1112 also includes a subtree_list element, where the subtree list element includes a subtree, as defined above, and a subtree_list. The subtree_list element can also be expressed as (subtree, subtree), which allows the recursion of (subtree, subtree_list) to terminate. An operator element includes an operator name, along with specification for the operator and a subtree_list.

FIG. 11A presents a query tree 1140, and an extended TES representation 1180 produced therefrom. A "root" node 1142 of the tree is an OrderBy operator. According to the definition 1112, the operator includes an operator name (in this case, OrderBy), the specification for the operator (sort specs) and a first subtree list. The first subtree list includes a TES corresponding to join 3, node 1144. For conciseness, the join type and predicate are omitted from the TES representation, which includes an identifier for join 3, the left child 1148 of the join and the right child 1150 of the join. In this case, the right child 1150 of the join is simply Table 4.

The left child 1148 corresponds to a node for a GroupBy operator. According to the definition 1112, the extended TES representation corresponds to the name of the operator (GroupBy), the specification for the operator (groupings, aggregations), and a subtree list. The subtree list for the GroupBy operator corresponds to a TES on which the GroupBy operator operates. Here, the subtree list includes elements for the subtrees for the binary operators of join 2, node 1162, and join 1, node 1164. The simplified TES elements for join 2 correspond to the identifier for the join, the left child node (join 1, node 1164), the TES elements for the subtree corresponding to join 1, Table 1 (node 1172) and Table 2 (node 1174), and a Table 3, node 1178, which is the right child of join 2.

In one implementation, the OrderBy operator of node 1142 and the GroupBy operator of node 1148 correspond to "structural forms," rather than being represented as edges or hyper-edges. Reordering is not considered within operations represented as structural forms, but may be considered for operations that precede or follow structural forms, provided they are represented as edges or hyper-edges.

For example, the GroupBy operator of node 1148 is represented by a structural form, and so it is not considered for reordering with respect to the join operations. However, reordering can still be considered between the joins 1162 and 1164.

Figure 11B:
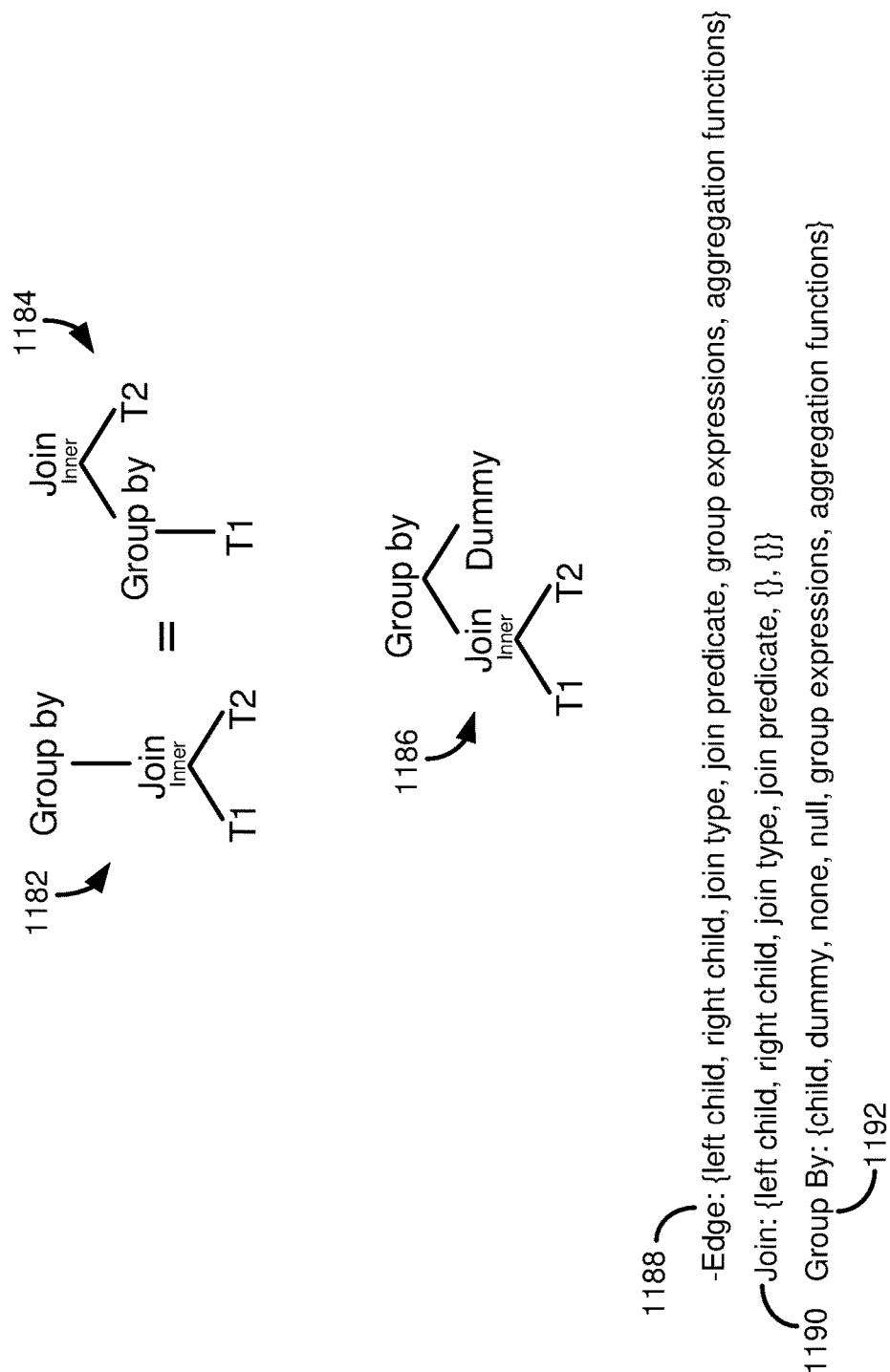
FIG. 11B illustrates a revised edge definition that allows for group by operations to be reordered when determining logical equivalency of query trees.

However, edges and hyper-edges can be redefined to allow for reordering of other operations, including group by operations. In particular, FIG. 11B illustrates logically equivalent query trees 1182, 1184. The group by operation in the query tree 1182 can be optionally "pushed through the join" to provide the query tree 1184.

The group by operator of query tree 1182 can be considered as having a form that is equivalent to a join, as shown in query tree 1186, where the group by operator has a left child, in the form of the join of the query tree 1182, and a right child that is a "dummy" relation. Using this conceptual representation, an edge can be defined to have the definition 1188. In this case, the definition 1188 includes the elements of the definition 1104 of FIG. 11A, but adds in additional elements for the group by operator, such as grouping expression and aggregation functions.

The revised edge definition 1188 can then be adapted for use with both joins and group by operations. In particular, an edge representation 1190 for a join includes empty sets for the grouping expressions and aggregation functions of the definition 1188. Similarly, an edge representation 1192 for a group by operation includes a single child and a dummy child. Group expressions and aggregation functions are provided, but the join type is listed as none, and the join predicate is NULL. Other values can be used to represent that a particular edge does not include some elements of the revised edge definition 1188.

Example 7—Example Query and Representation of Decomposed Query

FIG. 12 illustrates a practical example of how an extended TES representation can be generated. FIG. 12 illustrates an example query 1200. The example query corresponds to sorting and grouping operators performed on join results of a left deep series of joins.

An extended TES representation 1220 is provided for the example query 1200. Note that the extended TES representation 1220 includes operators, such as grouping and sorting, the joins of the query 1200, and also includes table access and filtering (SELECT) operations. In addition, note that the extended TES representation 1220 is sorted, in that the operators, edges, and table access operations are grouped.

To provide further insight between the example query 1200 and the extended TES representation 1220, consider selection operation 1240 that occurs in the query 1200 (rewritten so as to be more complete without the remainder of the operations of the example query being shown). An extended TES representation 1244 of the operation 1240 is provided. It can be seen that the extended TES representation 1244 includes an edge 1250, corresponding to a semi-join between the catalog_sales table and the date_dim table, where the values "1497" and "1630" correspond, respectively, to hash values of TableAccess(CATALOG_SALES) and the SELECT statement of the selection operation 1240. The extended TES representation 1244 also includes a representation of the selection clause, where "2760" correspond to the hash value of the "TableAccess(DATE_DIM)" operation.

As has been described, the extended TES representation 1220 can be used as a signature in determining whether all or a portion of another query is logically equivalent to the example query 1200. Since the grouping and sorting operations are applied after all joins have been completed, reordering of all the joins can be considered when searching for logically equivalent subtrees.

Figure 13:
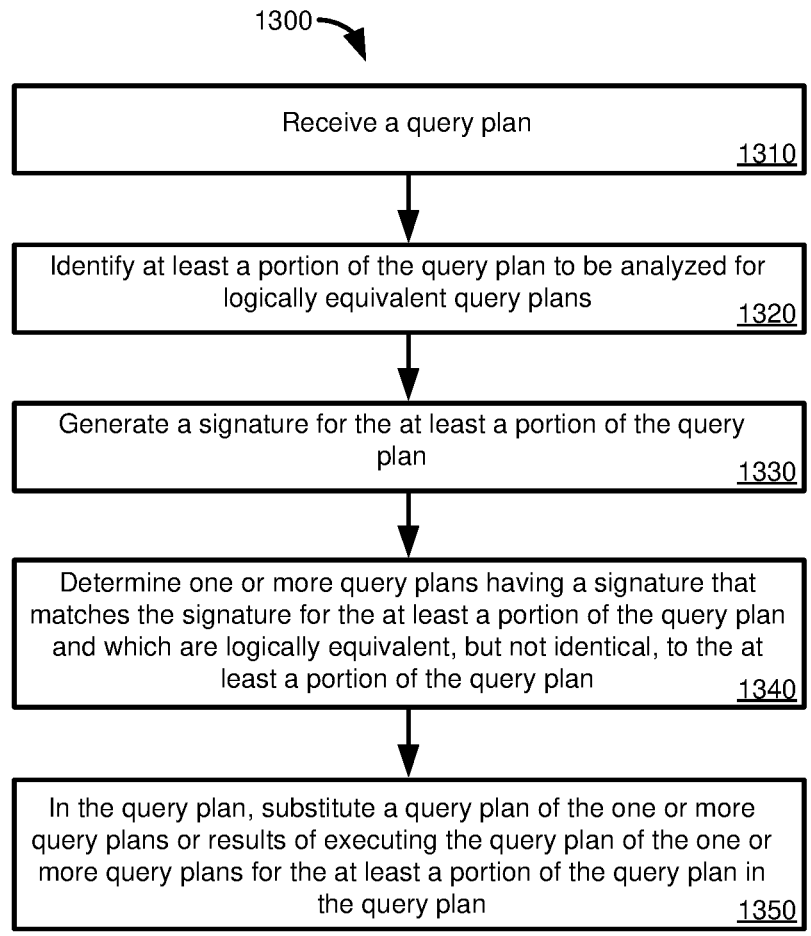
FIG. 13 is a flowchart of a process of substituting a portion of query plan with another query plan by comparing query plan signatures.

Example 8—Example Operations in Executing Triggers with Multiple Insert Operations FIG. 13 provides a flowchart of a process 1300 of substituting a portion of query plan with another query plan by comparing query plan signatures. A query plan is received at 1310. At 1320, at least a portion of the query plan to be analyzed for logically equivalent query plans is identified. A signature for the at least a portion of the query plan is generated at 1330. At 1340, one or more query plans having a signature that matches the signature for the at least a portion of the query plan and which are logically equivalent, but not identical, to the at least a portion of the query plan are determined. In the query plan, a query plan of the one or more query plans or results of executing the query plan of the one or more query plans are substituted at 1350 for the at least a portion of the query plan in the query plan.

Example 9—Computing Systems

Figure 14:
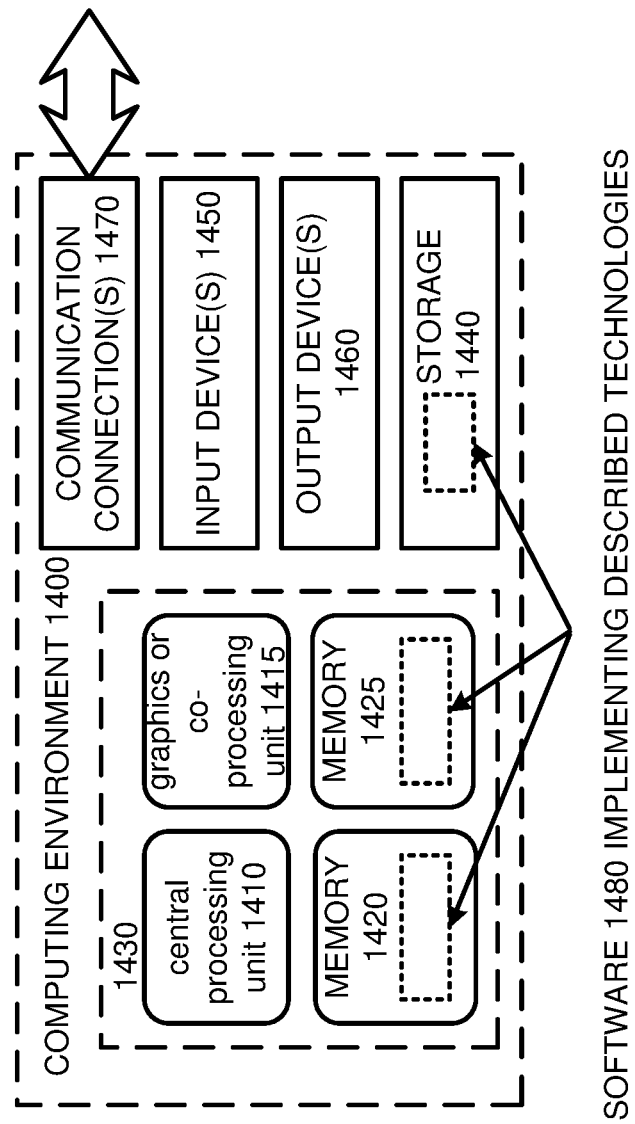
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing a database environment, and associated methods, described in Examples 1-8. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way, and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 15:
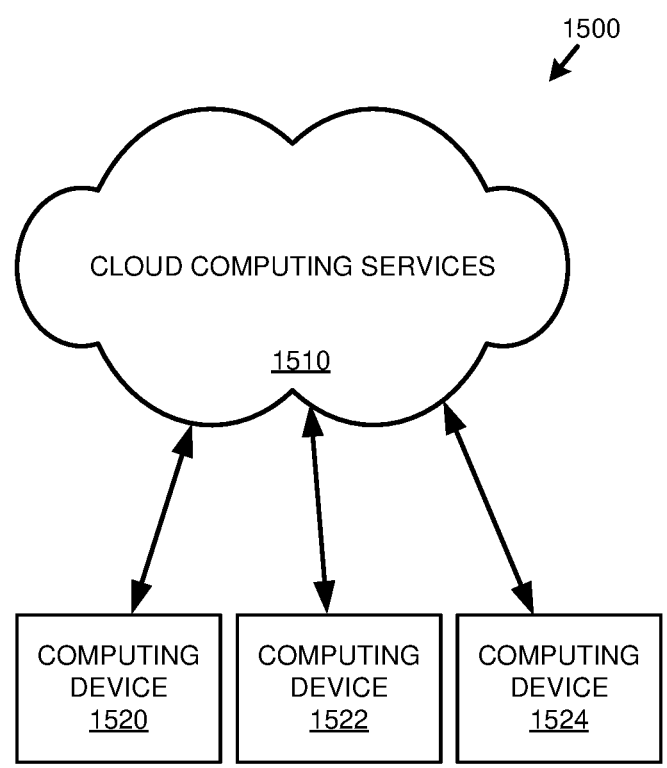
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
      receiving a query plan;
      identifying at least a portion of the query plan to be analyzed for logically equivalent query plans;
      generating a signature for the at least a portion of the query plan by decomposing the at least a portion of the query plan into a set of operators and operands, wherein the set and subsets of the set reflect relationships between operators and operands of the set or a subset thereof, and wherein the set or the subset forms a set of eligible operators and operands, wherein eligible operators and operands are useable in determining whether the set or the subset is logically equivalent to a set of operators and operands of another query plan;
      using the signature, determining one or more query plans having a signature that matches the signature for the at least a portion of the query plan and which are logically equivalent, but not identical, to the at least a portion of the query plan;
      in the query plan, substituting a query plan of the one or more query plans or results of executing the query plan of the one or more query plans for the at least a portion of the query plan in the query plan.

2. The computing system of claim 1, wherein the decomposing comprises decomposing a plurality of joins into constituent tables joined by the plurality of joins and the signature is generated from query subtrees generated by permutations of joins between a first table of the constituent tables and remaining tables of the constituent tables.

3. The computing system of claim 1, wherein the decomposing comprises forming a total eligibility set, the total eligibility set comprising a set of edges, an edge representing a join operation.

4. The computing system of claim 3, wherein the total eligibility set comprises one or more hyper-edges, wherein a hyper-edge places a constraint on an edge.

5. The computing system of claim 4, wherein an edge to which a hyper-edge applies is not reorderable in determining one or more query plans having a signature that matches the signature for the at least a portion of the query plan.

6. The computing system of claim 1, wherein the decomposing comprises forming an extended total eligibility set representing the at least a portion of the query plan, wherein the extended total eligibility set comprises representations of operators and join operations in the at least a portion of the query plan.

7. The computing system of claim 1, wherein substituting a query plan of the one or more query plans or results of executing the query plan of the one or more query plans for the at least a portion of the query plan in the query plan comprises uses a materialized view in place of the at least a portion of the query plan.

8. A method, implemented in a computing system comprising at least one hardware processor and at least one memory coupled to the at least one hardware processor, the method comprising:
   receiving a query plan;
   identifying at least a portion of the query plan to be analyzed for logically equivalent query plans;
   generating a signature for the at least a portion of the query plan by decomposing the at least a portion of the query plan into a set of operators and operands, wherein the set and subsets of the set reflect relationships between operators and operands of the set or a subset thereof, and wherein the set or the subset forms a set of eligible operators and operands, wherein eligible operators and operands are useable in determining whether the set or the subset is logically equivalent to a set of operators and operands of another query plan;
   using the signature, determining one or more query plans having a signature that matches the signature for the at least a portion of the query plan and which are logically equivalent, but not identical, to the at least a portion of the query plan;

in the query plan, substituting a query plan of the one or more query plans or results of executing the query plan of the one or more query plans for the at least a portion of the query plan in the query plan.

9. The method of claim 8, wherein the decomposing comprises decomposing a plurality of joins into constituent tables joined by the plurality of joins and the signature is generated from query subtrees generated by permutations of joins between a first table of the constituent tables and remaining tables of the constituent tables.

10. The method of claim 8, wherein the decomposing comprises forming a total eligibility set, the total eligibility set comprising a set of edges, an edge representing a join operation.

11. The method of claim 10, wherein the total eligibility set comprises one or more hyper-edges, wherein a hyper-edge places a constraint on an edge.

12. The method of claim 11, wherein an edge to which a hyper-edge applies is not reorderable in determining one or more query plans having a signature that matches the signature for the at least a portion of the query plan.

13. The method of claim 8, wherein the decomposing comprises forming an extended total eligibility set representing the at least a portion of the query plan, wherein the extended total eligibility set comprises representations of operators and join operations in the at least a portion of the query plan.

14. The method of claim 8, wherein substituting a query plan of the one or more query plans or results of executing the query plan of the one or more query plans for the at least a portion of the query plan in the query plan comprises uses a materialized view in place of the at least a portion of the query plan.

15. One or more non-transitory computer-readable storage media comprising:

computer-executable instructions that, when executed by a computing system comprising at least one hardware processor and at least one memory coupled to the at least one hardware processor, cause the computing system to receive a query plan;

computer-executable instructions that, when executed by the computing system, cause the computing system to identify at least a portion of the query plan to be analyzed for logically equivalent query plans;

computer-executable instructions that, when executed by the computing system, cause the computing system to generate a signature for the at least a portion of the query plan by decomposing the at least a portion of the query plan into a set of operators and operands, wherein the set and subsets of the set reflect relationships between operators and operands of the set or a subset thereof, and wherein the set or the subset forms a set of eligible operators and operands, wherein eligible operators and operands are useable in determining whether the set or the subset is logically equivalent to a set of operators and operands of an other query plan;

computer-executable instructions that, when executed by the computing system, cause the computing system to, using the signature, determine one or more query plans having a signature that matches the signature for the at least a portion of the query plan and which are logically equivalent, but not identical, to the at least a portion of the query plan;

computer-executable instructions that, when executed by the computing system, cause the computing system to, in the query plan, substitute a query plan of the one or more query plans or results of executing the query plan of the one or more query plans for the at least a portion of the query plan in the query plan.

16. The one or more non-transitory computer-readable storage media of claim 7, wherein the decomposing comprises decomposing a plurality of joins into constituent tables joined by the plurality of joins and the signature is generated from query subtrees generated by permutations of joins between a first table of the constituent tables and remaining tables of the constituent tables.

17. The one or more non-transitory computer-readable storage media of claim 15, wherein the decomposing comprises forming a total eligibility set, the total eligibility set comprising a set of edges, an edge representing a join operation.

18. The one or more non-transitory computer-readable storage media of claim 17, wherein the total eligibility set comprises one or more hyper-edges, wherein a hyper-edge places a constraint on an edge.

19. The one or more non-transitory computer-readable storage media of claim 18, wherein an edge to which a hyper-edge applies is not reorderable in determining one or more query plans having a signature that matches the signature for the at least a portion of the query plan.

20. The one or more non-transitory computer-readable storage media of claim 15, wherein the decomposing comprises forming an extended total eligibility set representing the at least a portion of the query plan, wherein the extended total eligibility set comprises representations of operators and join operations in the at least a portion of the query plan.

* * * * *